March 1, 1960 F. M. ASPIN 2,926,640
INTERNAL COMBUSTION ENGINES
Filed Sept. 17, 1957 5 Sheets-Sheet 1
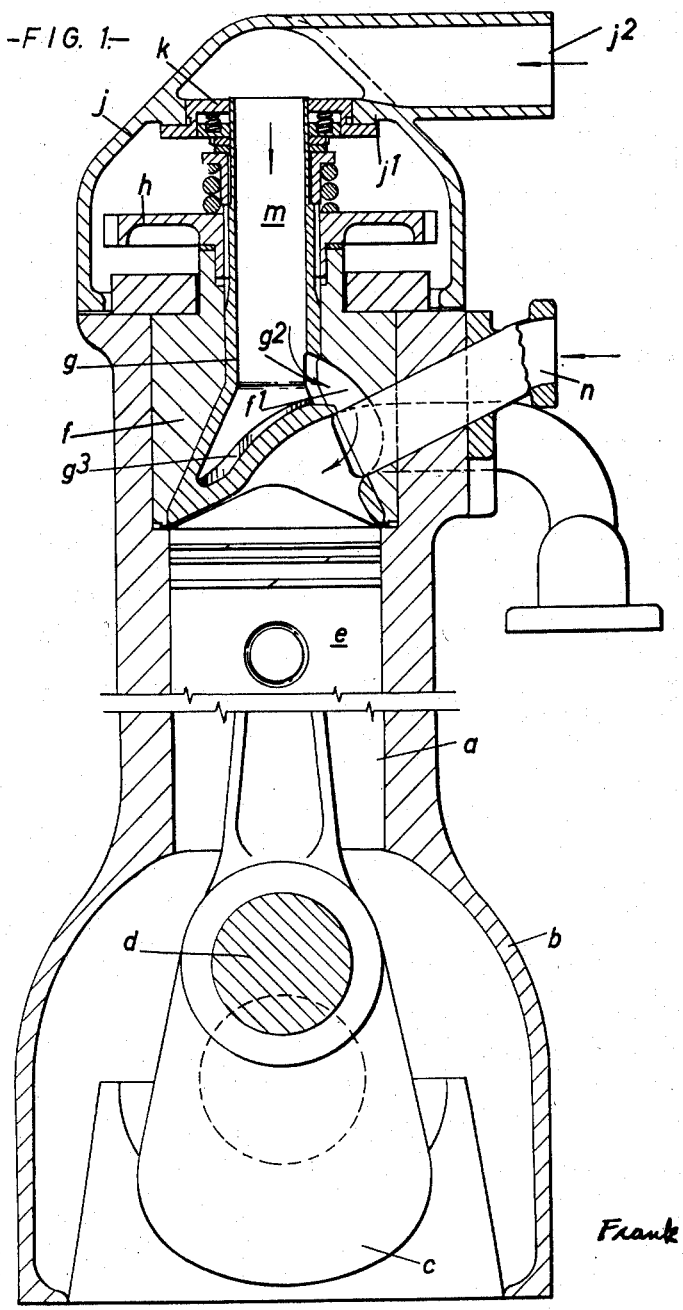
Frank M Aspin
INVENTOR
BY
ATTORNEY

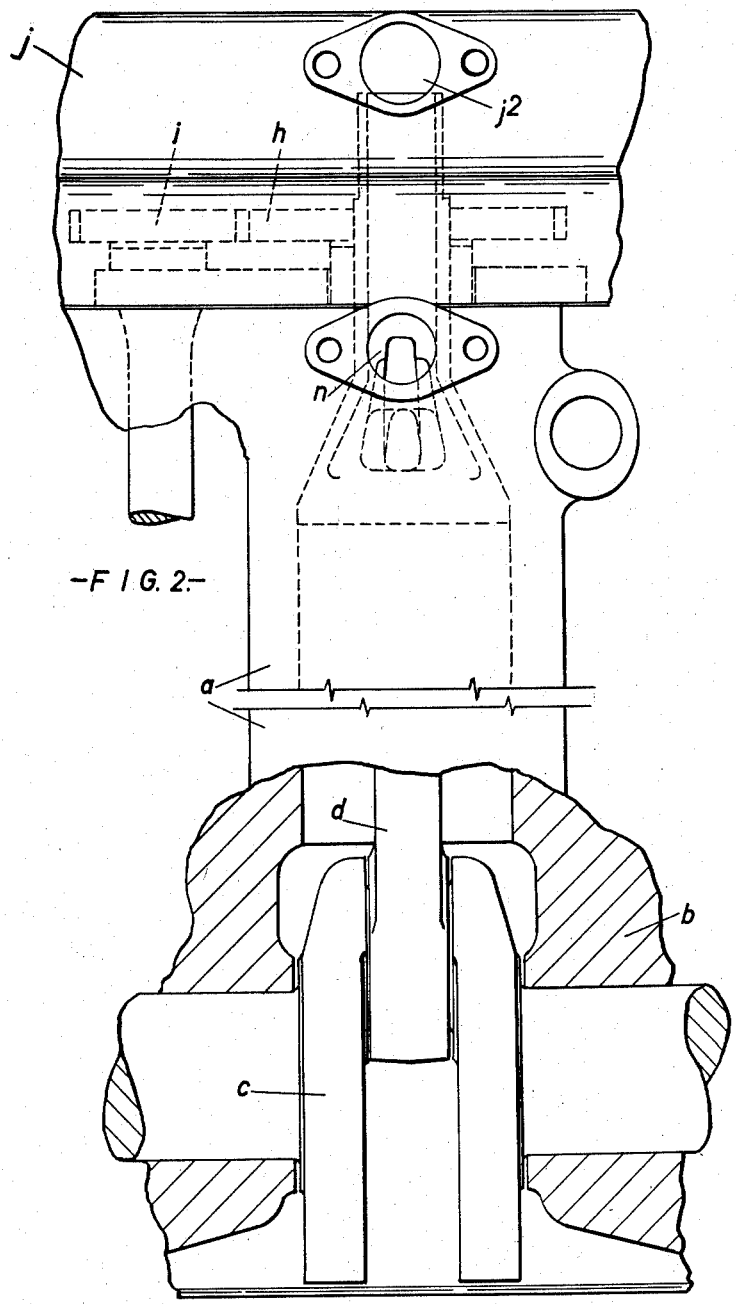

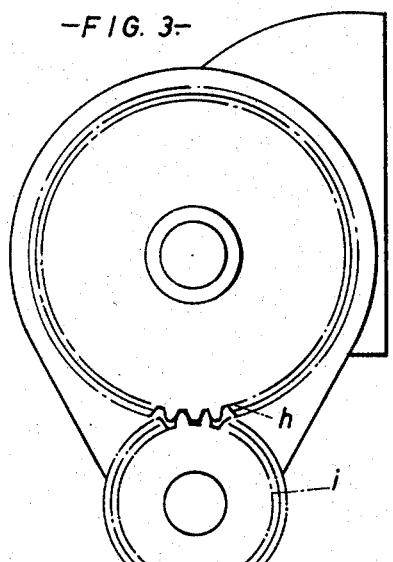
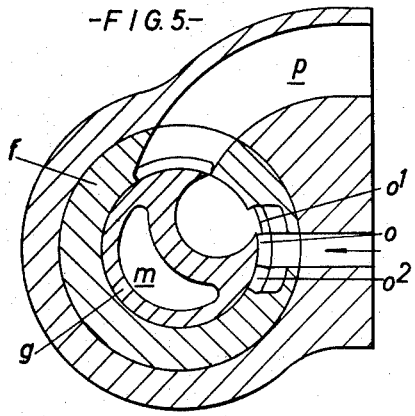
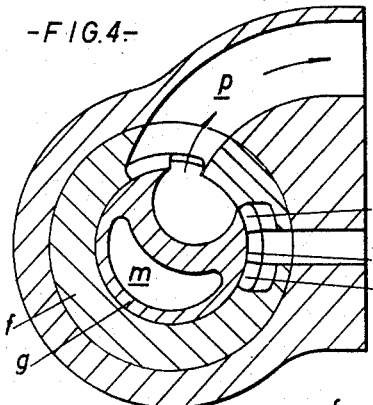
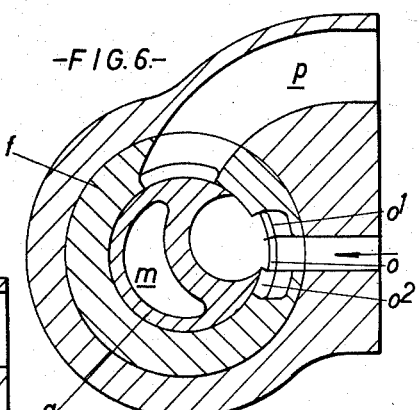
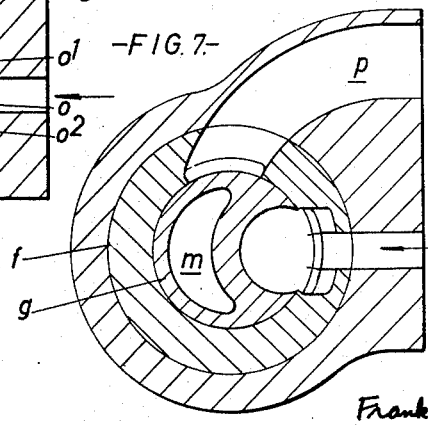

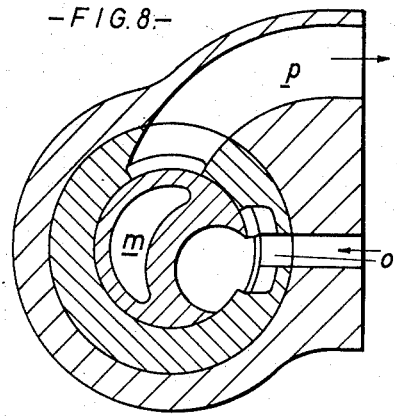
-FIG. 8.-
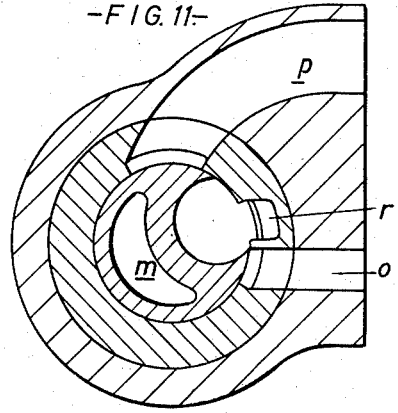
-FIG. 11.-
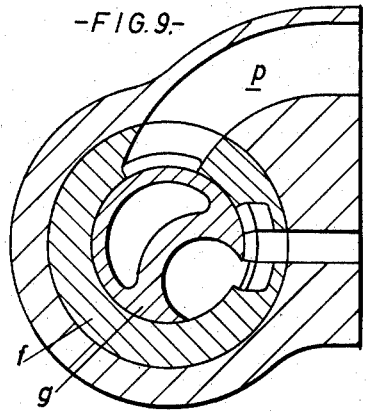
-FIG. 9.-
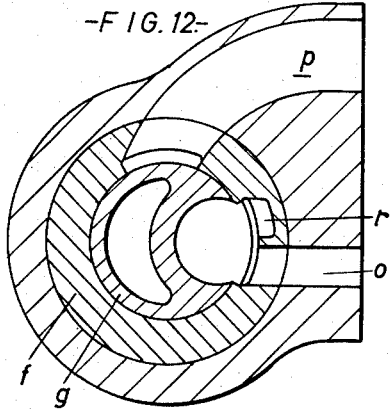
-FIG. 12.-
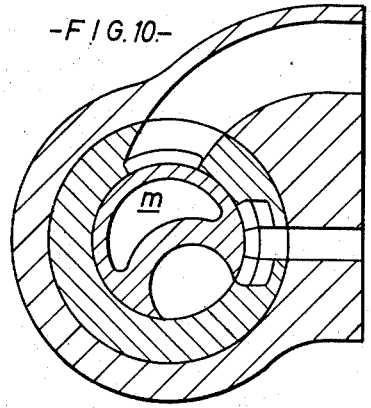
-FIG. 10.-
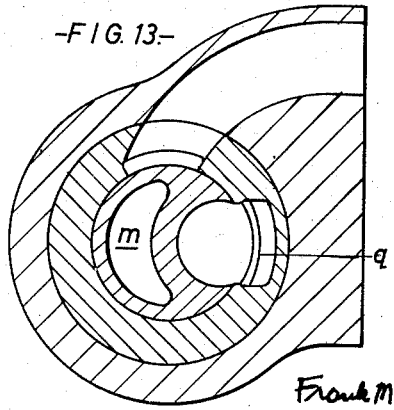
-FIG. 13.-

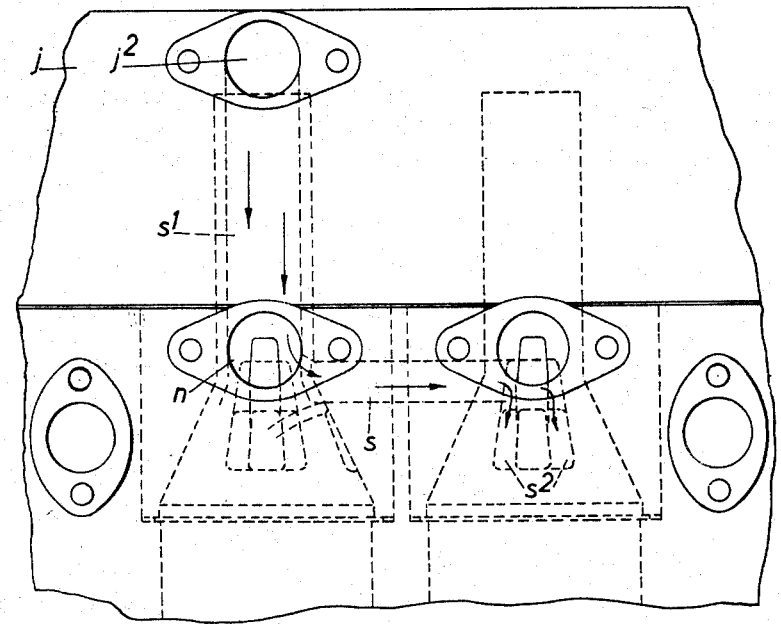
-FIG. 14.-
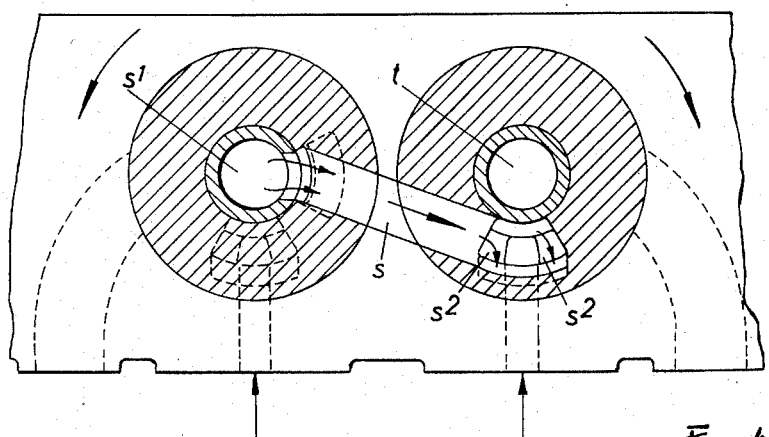
-FIG. 15.-

United States Patent Office 2,926,640
Patented Mar. 1, 1960

2,926,640

INTERNAL COMBUSTION ENGINES

Frank Metcalf Aspin, Alderley Edge, England

Application September 17, 1957, Serial No. 684,560

Claims priority, application Great Britain
September 17, 1956

8 Claims. (Cl. 123—41.17)

This invention relates to internal combustion engines, which expression is used to include compression ignition engines, of the kind (hereinafter termed the kind referred to) having a rotary valve in which is formed a chamber the volume of which is a major portion of the combustion space at the moment of maximum compression, such chamber opening axially to the engine cylinder and radially to a complementary port in a housing for the valve. An example of such kind of engine is to be found described in the specification of British Patent No. 463,412.

Experiment has shown that the temperature of the wall of such chamber, since it forms the combustion chamber, is an important factor in the running of the engine as a means, for example, for controlling combustion characteristics and that the cooler this can be kept the better is the control. This factor of combustion control is of major importance in the design of an engine of the kind referred to because of its high performance characteristic and because it determines the upper limit of performance to which an engine can be designed as this is determined largely by the compression ratio which can be usefully employed. On the other hand a modern trend in the design of internal combustion engines is towards air cooling, sometimes called direct cooling, in preference to liquid cooling by reason of its many known comparative advantages. Up to date however, internal combustion engines of the kind referred to have all been designed for liquid cooling of the combustion chamber through the medium of the lubricating oil or liquid cooling circulatory system of the engine, the oil or cooling liquid being introduced down a hollow stem of the rotary valve to impinge on the upper wall of the valve chamber therein and passing out again through the said hollow stem.

The object of the present invention is to obtain cooling of the wall of the rotary valve chamber without using a coolant liquid.

Another object of the invention is to syncronise such cooling with the engine cycle.

According to the invention an internal combustion engine of the kind referred to is characterised in that rotary valve is formed with a cooling space substantially covering the upper wall of the valve chamber and in that such space constitutes part of the inlet passage for the engine, whereby heat transference is obtained to the inlet charge through the said wall.

The internal combustion engine may be further characterised in that the said cooling space is formed with an axial entrance and radial exit, the valve housing having a passage with a port opening at one end complementary to said radial exit, said passage also forming part of the inlet passage for the engine; or further characterised in that the passage in the valve housing terminates at its other end in at least one port complementary to the radial opening of the valve chamber; or further characterised in that the passage in the valve housing terminates in a single port in advance of a main port complementary to the valve chambers; or further characterised in that the passage in the valve housing terminates in ports on each side of a main port complementary to the valve chamber; or further characterised in that inlet and outlet passages are provided in each valve housing and are interconnected by further passages whereby the inlet charge of one cylinder is drawing through the cooling space of the valve for another cylinder, or further characterised in that the interconnection is so arranged that the flow of induction charge through each valve space is substantially synchronised with the combustion cycle of the cylinder in which the valve is located.

In the accompanying drawings:

Fig. 1 is a sectional elevation of one example of a single cylinder internal combustion engine made in accordance with the present invention.

Fig. 2 is a part sectional elevation at right angles to Fig. 1.

Fig. 3 is a plan of the upper end of the cylinder of the engine of Fig. 1 showing the driving gearing for the rotary valve.

Figs. 4 to 10 are sectional plans showing diagrammatically the porting and part of the exhaust and the inlet cycles of the engine.

Figs. 11 and 12 show a modified arrangement of porting, and

Fig. 13 shows a further modified arrangement of porting.

Figs. 14 and 15 show 2 cylinders of a multicylinder engine with interconnected valve cooling passages.

As shown in Figs. 1 to 10, the engine comprises a single cylinder $a$ shown diagrammatically as integral with a crank base $b$ carrying a crankshaft $c$ on which is journalled the big-end of a connecting rod $d$ for a piston $e$. At the upper end of the cylinder is a valve housing $f$ in which is rotatably mounted a rotary valve $g$ adapted to be driven by a gear wheel $h$ and complementary pinion $i$. On the end of the cylinder is secured a valve cover $j$ in which is a gland packing $k$ complementary to the upper end of the valve and located in a partition $j^1$ in the cover, the upper compartment thus formed in the cover having an inlet connection $j^2$.

The stem of the rotary valve is hollow, as is also the head to form a cooling space $m$ the floor of which is formed by the upper wall of the chamber in the rotary valve. In the side of the valve is formed a port $g^2$ immediately above such upper wall whilst in the housing is a transfer passage $f^1$ having port ends complementary respectively to the port $g^2$ and to the lateral port in the valve chamber. Projecting into such passage so as to divide the same at the lower part of the passage is an inlet tube shown diagrammatically at $n$. Thus, as seen in Figs. 4 to 10, the inlet port in the housing is divided into three ports with a central port $o$ supplied by the tube $n$ and the ports $o^1$ and $o^2$ on each side thereof both supplied by the transfer passage $f^1$ in the valve housing. In the valve housing there is also the exhaust passage $p$.

As shown in Figs. 4 to 10, before the exhaust port is closed the valve chamber opens to the port $o^1$ of the transfer passage but is closed before the centre port $o$ of the valve housing is opened to the valve chamber. The subsequent opening of the port $o^2$ and the progressive closing of the three ports $o^1$, $o$ and $o^2$ successively are self-evident from the drawing. The economical scavenging effect, the subject of our co-pending application for Patent No. 666,378 is therefore obtainable by supplying fresh air to the inlet connection $j^2$ and rich fuel mixture to the inlet tube $n$, both air and mixture being under simultaneous throttle control at the carbureter.

The main feature of the invention is however, that whether air or mixture is supplied to the inlet $j^2$ it passes into the cooling space of the valve before entering the transfer passage and by reason of its direction of entrance, impinges on the upper wall of the combustion chamber in the valve. In order to increase the heat transference through such wall, fins $g^3$ may be provided as shown in Fig. 1 and these fins may be so shaped as to induce in the manner of fan blades, movement of the cooling medium towards the exit from the cooling space by reason of rotation of the valve. Such fins may be extended, if desired, up the hollow stem of the valve.

As shown in Figs. 11 and 12 the parts are substantially the same as in the preceding example and are therefore given the same reference numerals, but as regards the port in the valve housing the two ports $o^1$, $o^2$ are replaced by a single port $r$ in advance of the port $o$ which is relatively off-set.

As shown in Fig. 13 the port in the valve housing is provided solely by the transfer passage and in such case the whole of the required mixture from the carburetter is arranged to enter the inlet $j^2$, there being no inlet tube $n$. There is therefore only a single port $q$ of the transfer passage complementary to the valve chamber.

As shown in Figs. 14 and 15, the valves and ports are the same as shown in Fig. 2 and are therefore given the same reference characters with the exception of the new elements. Thus for one pair of cylinders is shown a transfer passage $s$ which connects the cooling space $a^1$ of the left hand cylinder with the valve chamber ports $s^2$ of the right hand cylinder. In a similar manner (not shown) the cooling space $t$ of the right hand cylinder may be connected to the valve chamber of another cylinder of the engine. The arrangement of passage $s$ shown in the drawing is designed to time the flow of the charge for the right hand cylinder so that it coincides with the combustion cycle of the left hand cylinder, and the same arrangement would preferably obtain for any other cylinders so connected.

Although described as applied to a carbureter fed engine it is obvious that the construction and arrangement of the cooling space and associated passages and ports is equally applicable to an engine arranged for fuel injection, whether for ignition or compression ignition, only air being then supplied to the cooling space, but where a vapourisible fuel is passed into the cooling space it will be obvious that heat will be absorbed by the action of vapourisation and thereby will help to keep the combustion chamber of the engine cooler. An important feature of the invention is that the cooling, in the same way as the heating, is relatively proportional to the engine power output because both are a function of the volume of the air or mixture charge passing to the cylinder. The cooling factor is therefore balanced at all times with the amount of heat to be dispersed, irrespective of engine speed.

The invention is particularly applicable to air-cooled engines, as although the compression ratios can be higher than normal and the combustion temperatures momentarily higher in consequence, the heat units to be removed are low because the area of the chamber wall exposed to the flame of combustion is small onto which a relatively large volume of cooling air or mixture may be directed.

The invention is obviously not limited to all the details of the examples above described in so far as such details may be modified without departing from the scope of the invention.

I claim:
1. An internal combustion engine of the kind referred to having a cylinder, a rotary valve therein, a combustion chamber in said valve communicating with said cylinder, said valve being hollow providing a cooling space for the wall of said chamber, an inlet opening into said space for inlet charge, and a passage from said space into said chamber.

2. An internal combustion engine according to claim 1 further characterised in that the said cooling space is formed with an axial entrance and radial exit, the valve housing having a passage with a port opening at one end complementary to said radial exit, said passage also forming part of the inlet passage for the engine.

3. An internal combustion engine according to claim 2 further characterised in that the passage in the valve housing terminates at its other end in at least one port complementary to the radial opening of the valve chamber.

4. An internal combustion engine according to claim 3 further characterised in the provision of a main port passing through said housing and terminating at said valve, and in that the passage in the valve housing terminates in ports on each side of said main port complementary to the valve chamber.

5. A multi-cylinder internal combustion engine according to claim 1 further characterized in that inlet and outlet passages are provided in each valve housing and are interconnected by further passages whereby the inlet charge of one cylinder is drawn through the cooling space of the valve for another cylinder.

6. A multi-cylinder internal combustion engine according to claim 5 further characterised in that the interconnection is so arranged that the flow of induction charge through each valve space is substantially synchronised with the combustion cycle of the cylinder in which the valve is located.

7. An internal combustion engine according to claim 3 further characterized in the provision of a main port passing through said housing and terminating at said valve, and in that the passage in the valve housing terminates in said main port.

8. An internal combustion engine of the kind referred to having a cylinder, a rotary valve therein, a combustion chamber in said valve communicating with said cylinder, said valve being hollow providing a cooling space for the wall of said chamber, an inlet opening into said space for inlet charge and a port in said housing adapted by the rotation of said valve to communicate alternatively with said combustion chamber and an exhaust port.

References Cited in the file of this patent

UNITED STATES PATENTS

| 1,720,206 | Carlson | July 9, 1929 |
| 2,384,461 | Gernandt | Sept. 11, 1945 |